(12) United States Patent
Crumbleholme

(10) Patent No.: US 11,357,288 B2
(45) Date of Patent: Jun. 14, 2022

(54) UPPER FOR AN ARTICLE OF FOOTWEAR

(71) Applicant: NIKE, Inc., Beaverton, OR (US)

(72) Inventor: Neil Crumbleholme, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 740 days.

(21) Appl. No.: 16/046,646

(22) Filed: Jul. 26, 2018

(65) Prior Publication Data

US 2019/0029368 A1 Jan. 31, 2019

Related U.S. Application Data

(60) Provisional application No. 62/539,295, filed on Jul. 31, 2017.

(51) Int. Cl.
*A43B 23/02* (2006.01)
*A43B 1/14* (2006.01)
(Continued)

(52) U.S. Cl.
CPC ............ *A43B 23/0235* (2013.01); *A43B 1/14* (2013.01); *A43B 7/085* (2013.01); *A43B 23/0205* (2013.01); *A43B 23/025* (2013.01); *A43B 23/026* (2013.01); *A43B 23/0215* (2013.01); *A43B 23/0245* (2013.01); *A43B 23/0255* (2013.01); *B32B 5/026* (2013.01); *B32B 27/12* (2013.01); *B32B 37/06* (2013.01); *B32B 37/10* (2013.01); *B32B 37/185* (2013.01); *D04B 1/26* (2013.01); *B32B 2250/03* (2013.01);
(Continued)

(58) Field of Classification Search
CPC ... A43B 23/026; A43B 23/07; A43B 23/0235; A43B 23/0295; A43B 23/0255; A43B 1/04
See application file for complete search history.

(56) References Cited

U.S. PATENT DOCUMENTS 4,430,811 A * 2/1984 Okada ...................... A43B 1/04
36/30 R
5,365,677 A * 11/1994 Dalhgren ................. A43B 1/04
36/3 A
(Continued)

FOREIGN PATENT DOCUMENTS

CH 508365 A 6/1971
CN 1625991 A 6/2005
(Continued)

OTHER PUBLICATIONS

International Preliminary Report on Patentability received for PCT Patent Application No. PCT/US2018/044351, dated Feb. 13, 2020, 10 pages.
(Continued)

*Primary Examiner* — Jillian K Pierorazio
(74) *Attorney, Agent, or Firm* — Shook, Hardy & Bacon LLP

(57) ABSTRACT

An upper for an article of footwear is disclosed. The upper can include a plurality of layers, such as an inner layer, a middle knit layer, and an outer layer. Each of the plurality of layers can provide different functionalities to the upper. The combination of the inner layer, middle knit layer, and the outer layer can be effective at transferring a load from the underfoot region to a position above the biteline.

9 Claims, 9 Drawing Sheets

(51) Int. Cl.
*A43B 7/08* (2022.01)
*B32B 5/02* (2006.01)
*B32B 27/12* (2006.01)
*B32B 37/06* (2006.01)
*B32B 37/10* (2006.01)
*B32B 37/18* (2006.01)
*D04B 1/26* (2006.01)
*D04B 1/24* (2006.01)
*D04B 21/20* (2006.01)

(52) U.S. Cl.
CPC ..... *B32B 2250/40* (2013.01); *B32B 2305/186* (2013.01); *B32B 2398/20* (2013.01); *B32B 2437/02* (2013.01); *D04B 1/24* (2013.01); *D04B 21/207* (2013.01); *D10B 2401/041* (2013.01); *D10B 2501/043* (2013.01)

(56) References Cited

U.S. PATENT DOCUMENTS

| | | | |
|---|---|---|---|
| 9,320,312 B2* | 4/2016 | Lyttle | A43B 1/00 |
| 9,635,905 B2 | 5/2017 | Dekovic | |
| 2005/0076541 A1* | 4/2005 | von Blucher | B32B 27/322 |
| | | | 36/113 |
| 2007/0094892 A1* | 5/2007 | Craig | A43B 7/1425 |
| | | | 36/10 |
| 2009/0090027 A1* | 4/2009 | Baudouin | A43B 7/1495 |
| | | | 602/23 |
| 2012/0297642 A1* | 11/2012 | Schaefer | A43B 1/0027 |
| | | | 36/45 |
| 2013/0160323 A1* | 6/2013 | Hsiao | A43B 3/248 |
| | | | 36/45 |
| 2013/0312284 A1* | 11/2013 | Berend | A43B 23/0245 |
| | | | 36/83 |
| 2014/0137434 A1* | 5/2014 | Craig | A43B 23/04 |
| | | | 66/170 |
| 2014/0259760 A1* | 9/2014 | Dojan | A43B 23/0275 |
| | | | 36/45 |
| 2015/0013187 A1* | 1/2015 | Taniguchi | B29D 35/08 |
| | | | 12/142 R |
| 2015/0040431 A1 | 2/2015 | Woodman et al. | |
| 2015/0121724 A1* | 5/2015 | Sung | A43B 1/10 |
| | | | 36/83 |
| 2015/0201707 A1* | 7/2015 | Bruce | A43B 23/04 |
| | | | 36/47 |
| 2015/0230541 A1* | 8/2015 | Bacino | A43B 23/026 |
| | | | 36/44 |
| 2015/0230563 A1* | 8/2015 | Bacino | A43B 17/006 |
| | | | 36/43 |
| 2015/0282565 A1* | 10/2015 | Kilgore | B29D 35/126 |
| | | | 427/389.9 |
| 2017/0035151 A1 | 2/2017 | Peyton et al. | |
| 2017/0208900 A1* | 7/2017 | Boucher | A43B 23/086 |

FOREIGN PATENT DOCUMENTS

| | | |
|---|---|---|
| CN | 105286169 A | 2/2016 |
| CN | 105286182 A | 2/2016 |
| CN | 105411079 A | 3/2016 |
| CN | 105744851 A | 7/2016 |
| CN | 105962542 A | 9/2016 |
| CN | 105996294 A | 10/2016 |
| CN | 106263226 A | 1/2017 |
| CN | 106418877 A | 2/2017 |
| CN | 106604656 A | 4/2017 |
| EP | 2595500 A2 | 5/2013 |

OTHER PUBLICATIONS

Cline, Ashley C., "Introducing Easyspurs: Functional, Flexible & Stylish Spurs for any Rider", Equestrian Stylist, published Dec. 5, 2012, 3 pages.
International Search Report and Written Opinion dated Dec. 10, 2018 in International Patent Application No. PCT/US2018/044351, 17 pages.
Office Action received for European Patent Application No. 18756043.8, dated Feb. 25, 2022, 7 pages.

* cited by examiner

UPPER FOR AN ARTICLE OF FOOTWEAR

CROSS-REFERENCE TO RELATED APPLICATIONS

This application claims priority to U.S. Provisional Application No. 62/539,295, filed Jul. 31, 2017, and entitled "AN UPPER FOR AN ARTICLE OF FOOTWEAR," the entire contents of which is incorporated by reference herein.

TECHNICAL FIELD

The present disclosure is directed to articles of footwear. More specifically, the present disclosure is directed to an upper that includes a plurality of layers, such as an inner layer, a middle knit layer, and an outer layer.

BACKGROUND

Various conventional articles of footwear may be designed to transfer a load from the underfoot area to the biteline. However, such a design does not effectively transfer a load from the underfoot area to regions beyond the biteline.

BRIEF DESCRIPTION OF THE DRAWINGS

Illustrative aspects of the present invention are described in detail below with reference to the attached drawing figures, which are incorporated by reference herein and wherein.

DESCRIPTION

Figure 1:
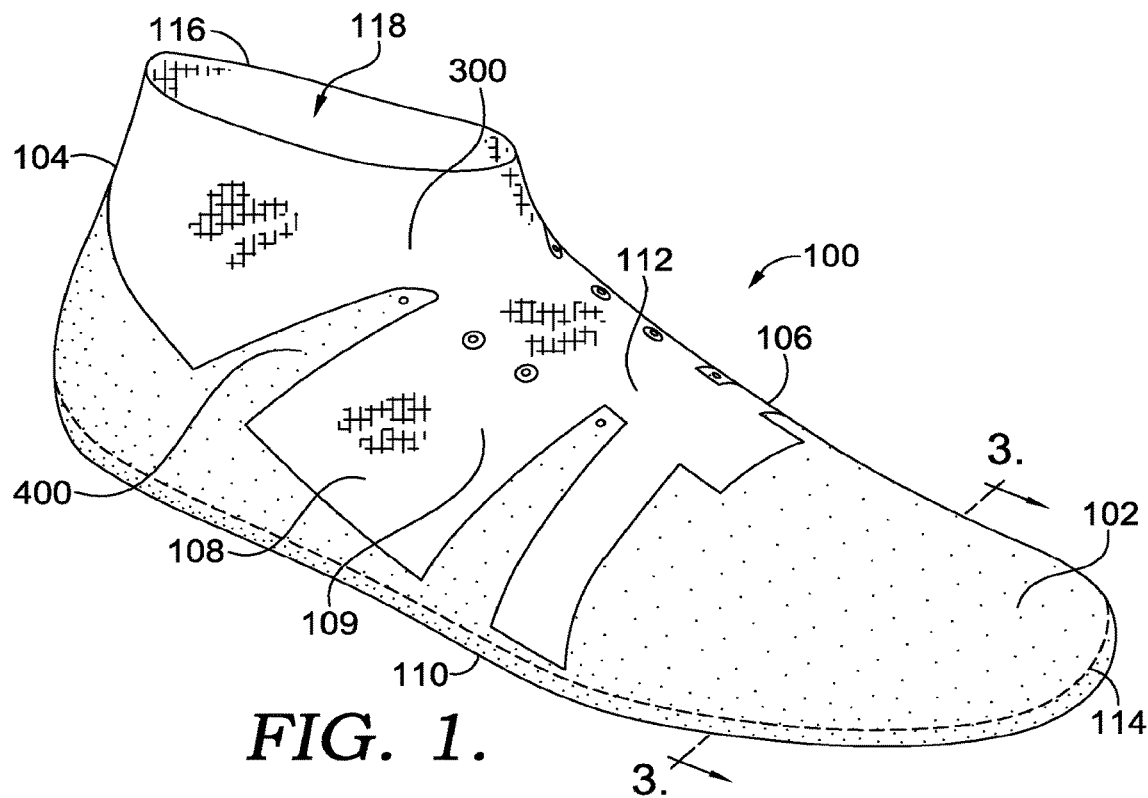
FIG. 1 is a top and side perspective view of an upper for an article of footwear, particularly showing the lateral side and toe end, in accordance with aspects hereof.

The subject matter of the present invention is described with specificity herein to meet statutory requirements. However, the description itself is not intended to limit the scope of this disclosure. Rather, it is contemplated that the disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

In general, aspects herein are directed to an upper for an article of footwear. In aspects, at a high level, the upper can include an inner layer, a middle layer, and an outer layer. In such aspects, each of the inner layer, the middle layer, and the outer layer can provide different functionality to the upper, and ultimately to an article of footwear.

Certain conventional uppers for an article of footwear may be designed to transfer a load from the underfoot portion to the biteline. However, such a design does not effectively transfer a load from the underfoot portion to a position on the upper beyond the biteline.

The upper for an article of footwear disclosed herein alleviates this and other problems. For example, in aspects, the upper disclosed herein includes a plurality of layers, which can, among other things, cooperatively transfer a load from an underfoot portion to a position on the upper beyond the biteline.

In certain aspects, the upper disclosed herein can include an inner layer, a middle knit layer, and an outer layer. In such aspects, the inner layer of the upper can provide certain functionalities, such as padding, elasticity, or rigidity in specific areas. For instance, in one aspect, the inner layer can include an increased thickness or padding in the heel portion to provide added comfort and or support for the wearer.

In various aspects, the inner layer may include a minimal underfoot portion in order to reduce the effective weight of the upper and/or article of footwear. In one aspect, this minimal underfoot portion can include a lattice-like construction reducing the overall weight of the upper, as well as reducing material and manufacturing costs.

In aspects, the middle layer of the upper can be a middle knit layer. In various aspects, the middle knit layer can be structurally comprised of a knit or engineered textile. In such aspects, the middle knit layer may resemble a sock-like structure and can provide around-the-foot support for a wearer. For example, in such an aspect, the middle knit layer can include a knit portion that covers the underfoot portion, the heel region, the toe region, the midfoot region, and the forefoot region. In one aspect, as discussed further below, the middle knit layer can include elastic properties and/or elastic materials so that the middle knit layer can provide a secure fit or feel on the wearer's foot. In aspects, the middle knit layer can be a circular knit component or a flat knit component. In various aspects, the middle knit layer can partly or fully cover the inner layer. In aspects, the elasticity of the middle knit layer can facilitate compression of the inner layer up against the wearer's foot for a secure fit.

In various aspects, the outer layer can be compositionally comprises of at least one thermoplastic material. In aspects, the thermoplastic material can include a thermoplastic polymeric composition, which is discussed further below. In certain aspects, the outer layer can include an underfoot portion that can extend past the biteline. For example, in aspects, such an outer layer can facilitate transferring a structural load from the underfoot portion to a position past the biteline, e.g., to the midfoot and/or forefoot region, which can provide a more responsive and natural-feeling upper for an article of footwear.

In various aspects, as discussed further below, the outer layer can be mechanically coupled to the middle knit layer. For example, in one aspect, the upper can be thermoformed such that the thermoplastic outer layer melts and cools while being compressed against the middle knit layer, which can mechanically couple together the middle knit layer and outer layer to provide a unified, responsive upper.

In one or more aspects, the outer layer can be coupled to a bottom unit, e.g., an outsole. In certain aspects, the thermoplastic material can facilitate the coupling together of the bottom unit and the outer layer. For instance, in one aspect, the bottom unit can be coupled to the upper during the thermoforming process, where the melted, cooled, and re-solidified thermoplastic material functions as a bonding agent by mechanically coupling the upper to the bottom unit. In alternative aspects, a bottom unit can be coupled to the post thermoformed upper, where a separate bonding agent can be used to couple together a bottom unit to the upper.

Accordingly, in one aspect, an upper for an article of footwear is provided. The upper has a toe end, a heel end, a medial side, a lateral side, and a biteline extending around the toe end, the medial side, the heel end, and the lateral side. The upper includes an inner layer extending to at least the toe end, the heel end, the medial side, and the lateral side of the upper. The upper also includes a middle knit layer extending to an underfoot portion of the upper. The middle knit layer covers the inner layer at least at the medial side, the lateral side, the toe end, and the heel end of the upper. Further, the upper includes an outer layer coupled with the middle knit layer. The outer layer compositionally comprises at least one thermoplastic material. The outer layer extends from a first position below the biteline at the underfoot portion of the upper to a second position above the biteline, where the second position above the biteline is at least one selected from a midfoot region of the upper and the toe end of the upper.

In yet another aspect, a method for manufacturing an upper for an article of footwear is provided. The upper has a toe end, a heel end, a medial side, a lateral side, and a biteline extending around the toe end, the medial side, the heel end, and the lateral side. The method includes receiving an upper. The upper includes an inner layer extending to at least the toe end, the heel end, the medial side, and the lateral side of the upper. The upper also includes a middle knit layer extending to an underfoot portion of the upper. The middle knit layer is adjacent the inner layer at least at the medial side, the lateral side, the toe end, and the heel end of the upper. Further, the upper includes an outer layer that is adjacent to at least a portion of the middle knit layer. The outer layer compositionally comprises at least one thermoplastic material. The outer layer extends from a first position below the biteline at the underfoot portion of the upper to a second position above the biteline, where the second position above the biteline is at least one selected from a midfoot region of the upper and the toe end of the upper. The method also includes placing the upper on a form. Additionally, the method includes exposing the upper to a thermal energy source while the upper is positioned on the form.

Figure 2:
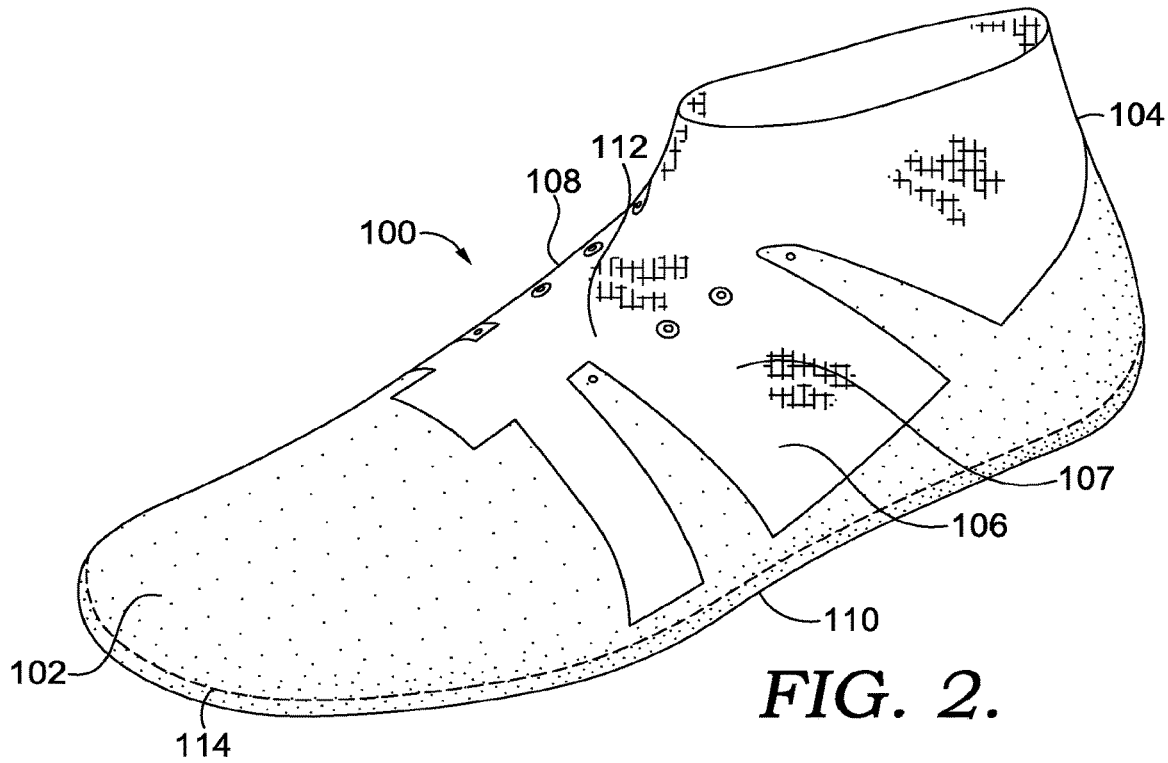
FIG. 2 is a top and side perspective view of the upper for an article of footwear depicted in FIG. 1, particularly showing the medial side and the toe end, in accordance with aspects hereof.
Figure 3:
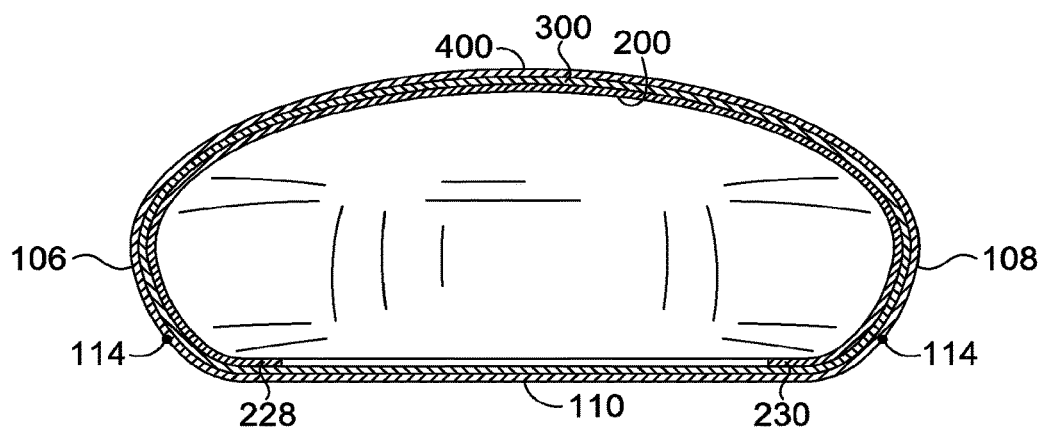
FIG. 3 is a cross-sectional view along the cutline 3 of the upper of FIG. 1, particularly showing three layers of the upper, in accordance with aspects hereof.
Figure 17A:
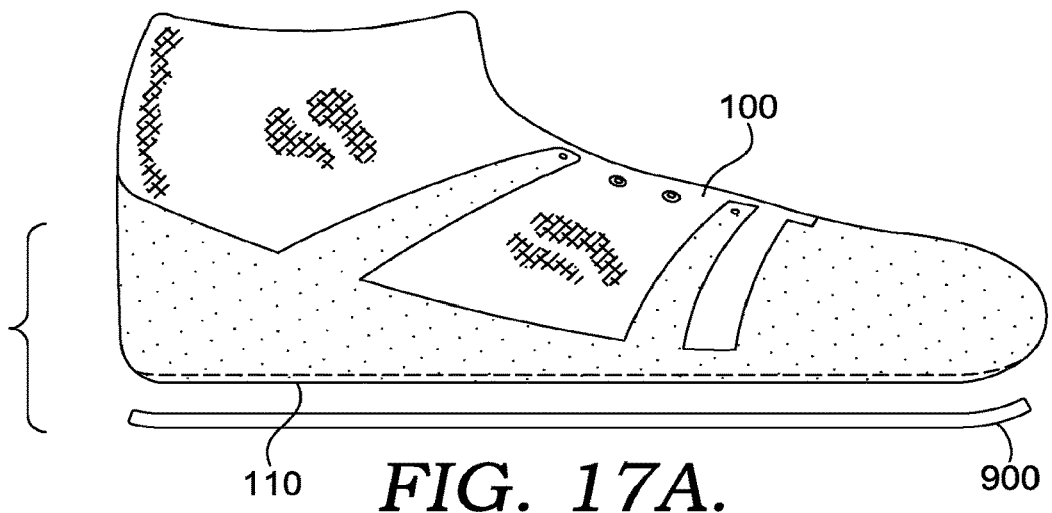
FIG. 17A is a side view of an upper and a bottom unit for securing to the underfoot portion of the upper, in accordance with aspects hereof.
Figure 17B:
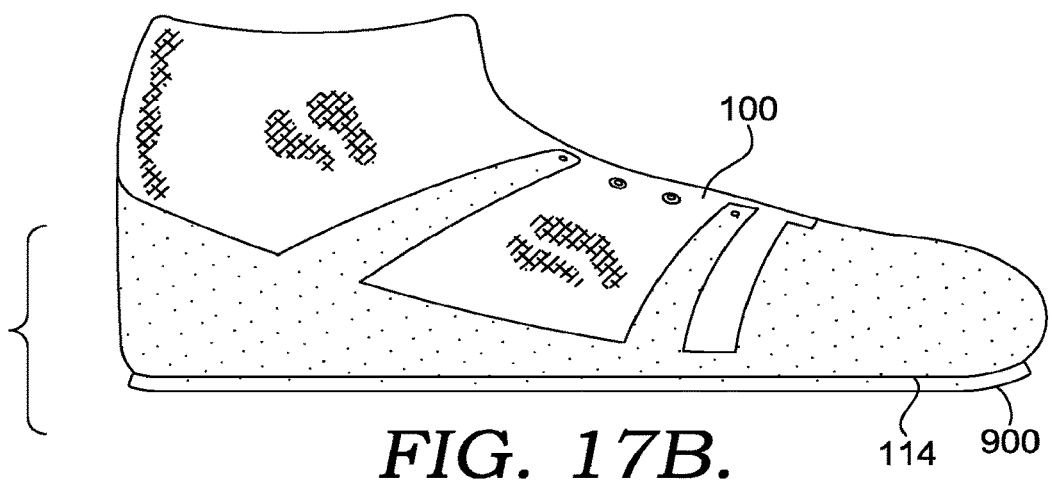
FIG. 17B is a side view of the upper of FIG. 17A, with the bottom unit secured to the underfoot portion of the upper, in accordance with aspects hereof.

Turning now to the figures, and FIGS. 1-3 in particular, one aspect of an upper 100 for an article of footwear is depicted. Throughout this description, various portions of the upper 100 or another upper may be referenced. In exemplary aspects, these portions of the upper 100 are highlighted in FIGS. 1, 2, and/or 3 with the following names or regions, and associated reference numerals: a toe end 102, a heel end 104, a medial side 106, a lateral side 108, a medial midfoot region 107, a lateral midfoot region 109, an underfoot portion 110, a forefoot portion 112, an ankle collar 116, and a void 118. As can also be seen in FIGS. 1 and 2, a biteline 114 in phantom is depicted. The biteline 114 is the interface where the top portion of bottom unit meets the upper, which is also depicted in FIG. 17B (e.g., not in phantom).

In aspects, the upper 100 can include an inner layer 200, a middle knit layer 300, and an outer layer 400, as can be best seen in FIG. 3, which depicts a cross-sectional view along the cutline 3 in the toe end 102 of the upper 100 of FIG. 1. In the views of the upper 100 depicted in FIGS. 1 and 2, the inner layer 200 is not visible as it is positioned inside the middle knit layer 130.

Figure 4:
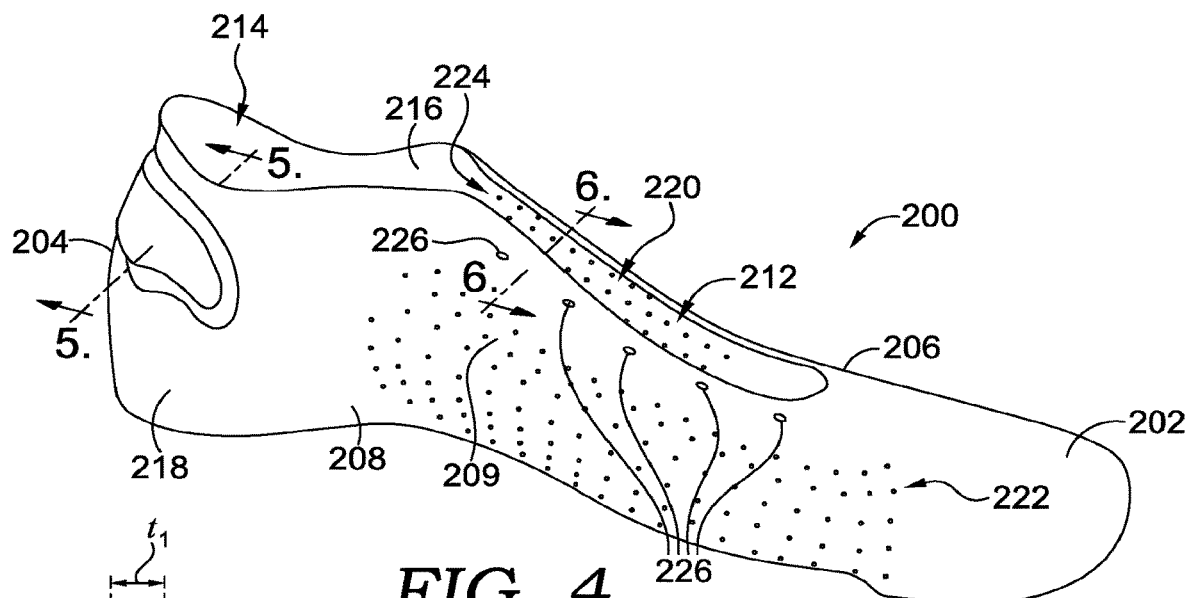
FIG. 4 is a side perspective view of an inner layer of an upper for an article of footwear, in accordance with aspects hereof.

In the aspect depicted in FIG. 4, the inner layer 200 can include a void 214 for receiving a wearer's foot. Further, the inner layer 200 depicted in FIG. 1, includes an inner surface 216 that may contact the wearer's foot when received within the void 214. The inner layer 200 also includes an outer surface 218 opposite the inner surface 216. The inner layer 200 depicted in FIG. 4 can generally extend from the heel end 204 to the toe end 202 on the medial side 206 and the lateral side 208. In aspects, the inner layer 200 can include an opening 220 in the forefoot region 212. The inner layer 200 can also include a row of apertures 226 on the lateral side 208 that extend from the inner surface 216 to the outer surface 218, which can function as eyestays. A similar row of apertures may also be present on the medial side 206.

In certain aspects, as discussed above, it may be desirable to reduce the overall weight of the upper 100, or to minimize the manufacturing and/or material costs. In such aspects, the inner layer 200 of the upper 100 may include a minimal underfoot portion or may not include an underfoot portion at all. For example, in aspect depicted in FIG. 3, the inner layer 200 is generally absent in the underfoot portion 110, except for the minimal portions 228 and 230 that extend below the biteline 114 on the medial and lateral sides 106 and 108, respectively. In one or more aspects, the inner layer 200 may include an underfoot portion in the form of a lattice structure in order to allow further coupling between the medial side 106 and the lateral side 108 in the underfoot region, while still minimizing the weight of the upper and/or reducing the material costs.

In various aspects, the inner layer 200 can be any type of material including a knit textile, a braided textile, a woven textile, and a non-woven textile, a film, a sheet, or a molded article, such as an injection molded article, a foamed material, or a combination thereof. In the same or alternative aspects, the inner layer 200 can include natural materials, synthetic materials, or a combination of natural and synthetic materials. In an exemplary aspect, the inner layer 200 can include a non-woven textile. In various aspects, the inner layer 200 may include multiple pieces of one or more materials that are secured together, e.g., by bonding or stitching.

As discussed above, in various aspects, the inner layer 200 can provide certain functional characteristics or properties to the upper 100. For example, in certain aspects, the inner layer 200 can include a plurality of apertures 222 and 224 to allow for increased breathability. In the aspect depicted in FIG. 4, the plurality of apertures 222 can be positioned on the lateral side 208 of the inner layer 200 and can extend from the inner surface 216 through the outer surface 218 of the inner layer 200. In certain aspects, the plurality of apertures 224 can be positioned on the medial side 206 of the inner layer 200 and can also extend from the inner surface 216 through the outer surface 218 of the inner layer 200.

Figure 5:
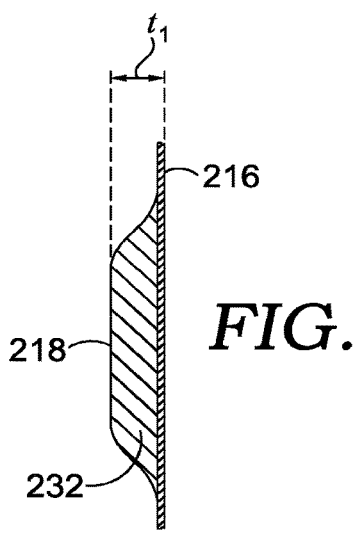
FIG. 5 is a cross-sectional view along the cutline 5 of the inner layer of FIG. 4, in accordance with aspects hereof.
Figure 6:
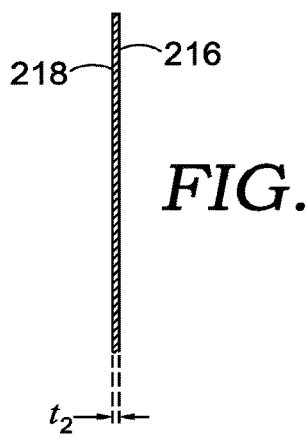
FIG. 6 is a cross-sectional view along the cutline 6 of the inner layer of FIG. 4, in accordance with aspects hereof.

As discussed above, the inner layer 200 can include padding in order to provide stability or comfort for the wearer. As can be seen in FIGS. 4-6, the inner layer 200 in the heel region 204 has an increased thickness $t_1$ between the inner surface 216 and the outer surface 218 of the inner layer 200 compared to the thickness t2 between the inner surface 216 and the outer surface 218 in the lateral midfoot region 209. The padding 232 provided in the heel region 204 that provides for an increased thickness can be formed from any type of material, such as the materials mentioned above that may form the inner layer 200.

Figure 7:
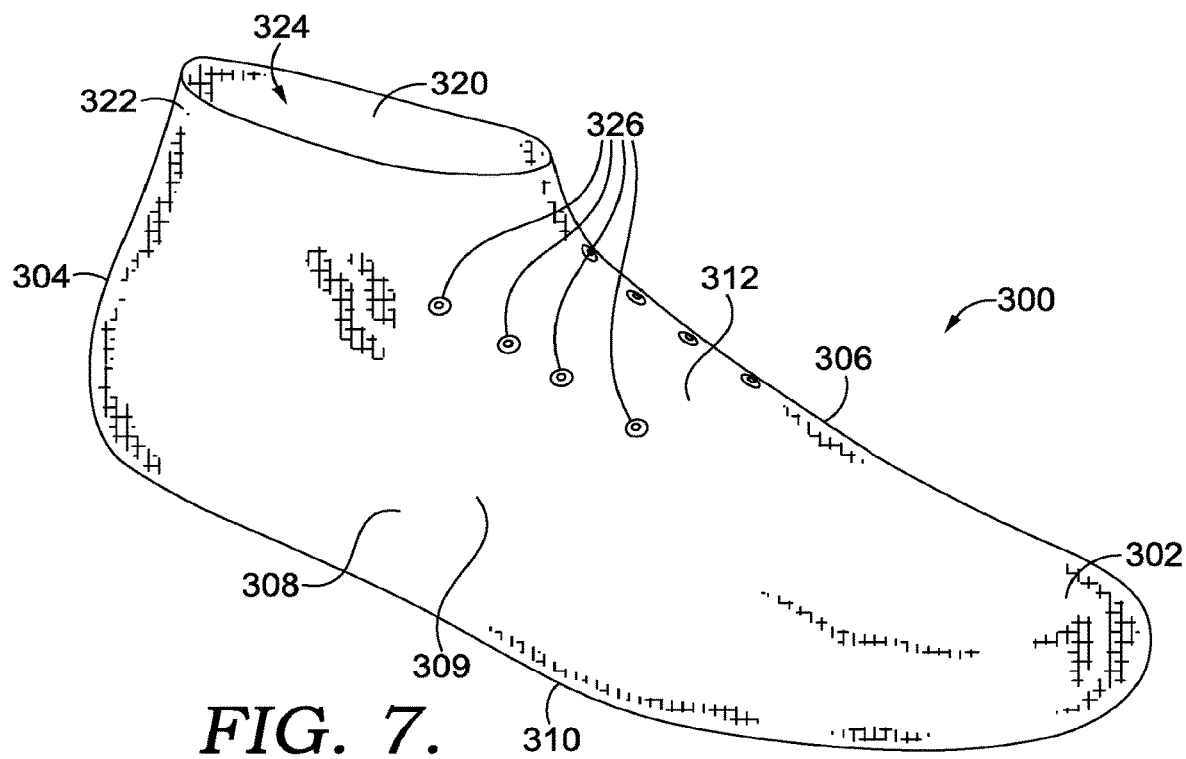
FIG. 7 is a top and side perspective view of a middle knit layer of an upper for an article of footwear, in accordance with aspects hereof.

Turning now FIG. 7, which depicts one aspect of a middle knit layer 300 utilized in the upper 100. In aspects, the middle knit layer 300 can include an inner surface 320 (e.g., facing the inner layer 200) and an opposing outer surface 322 (e.g., facing the outer layer 400).

In various aspects, the middle knit layer 300 can be structurally comprised of a knitted or engineered textile. In aspects where the middle knit layer 300 is structurally comprised of a knitted textile, the middle knit layer 300 may be formed as an integral one-piece element during a knitting process, such as a weft knitting process (e.g., with a flat knitting machine or circular knitting machine), a warp knitting process, or any other suitable knitting process. That is, the knitting process may substantially form the knit structure of the middle knit layer 300 without the need for significant post-knitting processes or steps. Alternatively, two or more portions of the middle knit layer 300 may be formed separately and then attached. In some embodiments, the middle knit layer 300 may be shaped after the knitting process to form and retain the desired shape of the middle knit layer 300 (for example, by using a foot-shaped last). The shaping process may include attaching the middle knit layer 300 to another object (e.g., a strobel) and/or attaching one portion of the knitted component to another portion of the knitted component at a seam by sewing, by using an adhesive, or by another suitable attachment process.

In the aspect depicted in FIG. 7, the middle knit layer 300 can be sock-like in that the middle knit layer 300 can substantially cover a wearer's foot. In aspects, the middle knit layer 300 can extend from the toe end 302 to the heel end 304, and from the underfoot portion 310 up the medial side 306 to a void 324 (and up the lateral side 308 to the void 324). In the same or alternative aspects, the middle knit layer 300 may also cover at least a portion of the forefoot region 312.

The middle knit layer 300 may provide the upper 100 with advantageous characteristics including, but not limited to, a particular degree of elasticity (for example, as expressed in terms of Young's modulus), breathability, bendability, strength, moisture absorption, weight, and abrasion resistance. In such aspects, these characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a monofilament material, or an elastic material such as spandex), by selecting yarns of a particular size (e.g., denier), or a combination thereof.

In various aspects, the middle knit layer 300 may also provide desirable aesthetic characteristics by incorporating yarns having different colors or other visual properties arranged in a particular pattern. In such aspects, the yarns and/or the knit structure of the middle knit layer 300 may be varied at different locations such that the middle knit layer 300 has two or more portions with different properties (e.g., a portion forming the forefoot area of the upper may be relatively elastic while another portion may be relatively inelastic).

In various aspects, the middle knit layer 300 may incorporate one or more materials with properties that change in response to a stimulus (e.g., temperature, moisture, electrical current, magnetic field, or light). For example, the middle knit layer 300 may include yarns formed of a thermoplastic polymer material (e.g., polyurethanes, polyamides, polyolefins, and nylons) that transitions from a solid state to a softened or liquid state when subjected to certain temperatures at or above its melting point and then transitions back to the solid state when cooled. In such aspects, the thermoplastic polymer material may provide the ability to heat and then cool a portion of the knitted component to thereby form an area of bonded or continuous material that exhibits certain advantageous properties including a relatively high degree of rigidity, strength, and water resistance, for example.

In some aspects, the middle knit layer 300 may include one or more yarns or strands that are at least partially inlaid or otherwise inserted within the knit structure of the knitted component during or after the knitting process, herein referred to as "tensile strands." The tensile strands may be substantially inelastic so as to have a substantially fixed length. The tensile strands may extend through a plurality of courses of the middle knit layer or through a passage within the knitted component and may limit the stretch of the knitted component in at least one direction. For example, the tensile strands may extend approximately from a biteline of the upper to a forefoot region of the upper to limit the stretch of the upper in the lateral direction. The tensile strands may form one or more lace apertures for receiving a lace and/or may extend around at least a portion of a lace aperture formed in the knit structure of the knitted component.

Figure 9:
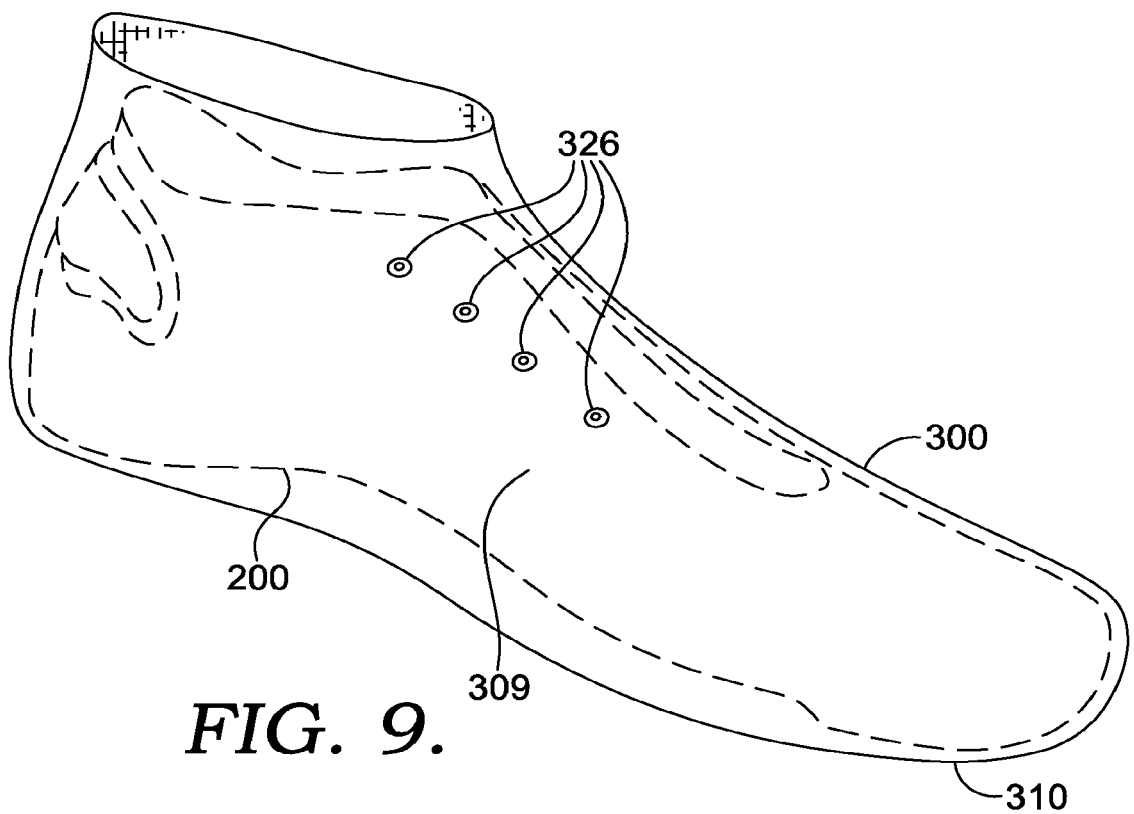
FIG. 9 is a top and side perspective view of a middle knit layer of an upper with an inner layer of the upper positioned inside the middle knit layer, in accordance with aspects hereof.

In certain aspects, as best seen in FIG. 9, the middle knit layer 300 can substantially encompass the inner layer 200 (depicted in phantom). In various aspects, the middle knit layer 300 can be coupled to the inner layer 200 using any conventional techniques, such as stitching or bonding. In one aspect, the middle knit layer 300 and the inner layer 200 may be coupled, e.g., through stitching or bonding, to one another at a row of apertures 326 on the middle knit layer 300, which may function as eyestays. In such an aspect, similar apertures from the inner layer 200, e.g., the apertures 226, may coincide with the apertures 326 to allow for one or more combined apertures, thereby facilitating the use of these apertures 326 and 226 as eyestays.

In the same or alternative aspects, the middle knit layer 300 and the inner layer 200 may be coupled to one another at certain positions while being uncoupled at other positions or regions. For instance, in one aspect, the middle knit layer 300 may be coupled to the inner layer 200 at or near the underfoot portion 310 and/or at or near the apertures 326, with no coupling in the lateral midfoot region 309 of the middle knit layer 300. In such an aspect, the uncoupled regions can allow for stretching and movability of the layers 200 and 300 with respect to one another, while the inner layer 200 and the middle knit layer 300 are still anchored together at the coupled regions.

In certain aspects, as discussed above, the middle knit layer 300 may exhibit elastic properties, which may apply a compressive force on the inner layer 200 to provide a secure and snug fit, as well as a more secure interface between the inner layer 200 and the middle knit layer 300, e.g., by increased friction between the layers.

Figure 8:
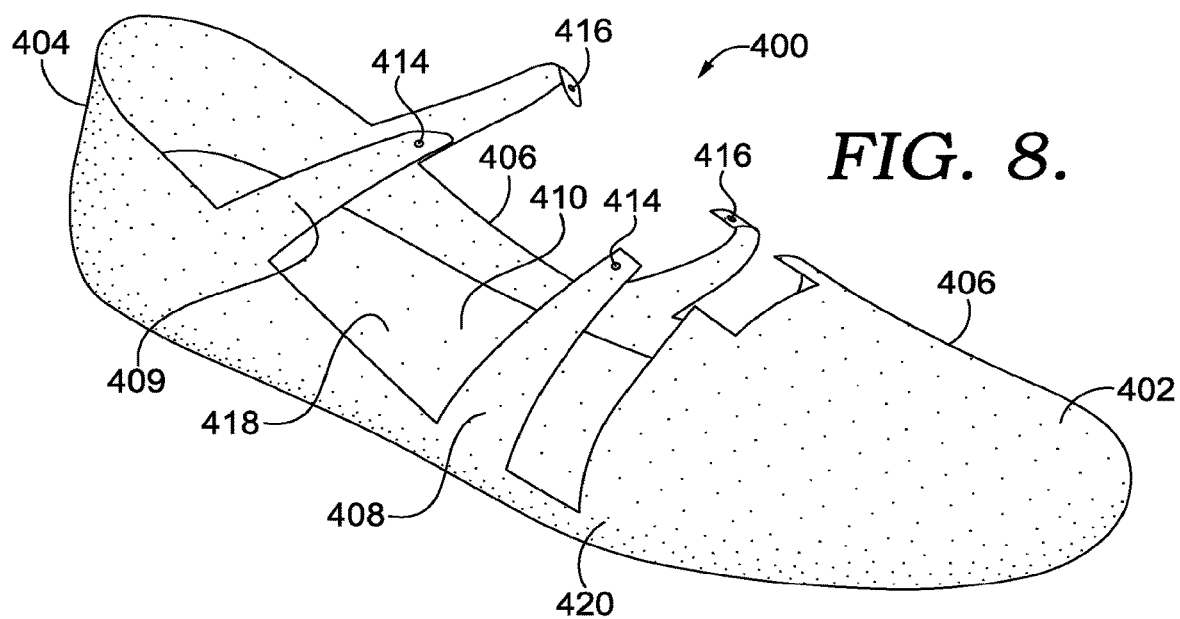
FIG. 8 is a top and side perspective view of an outer layer of an upper for an article of footwear, in accordance with aspects hereof.

Turning now to FIG. 8, the outer layer 400 is depicted in isolation. The outer layer 400 of FIG. 8 is depicted prior to being thermoformed. As discussed above and below, the upper manufacturing process disclosed herein includes thermoforming the layers of the upper to form the final upper 100 depicted in FIGS. 1-3. In aspects, the outer layer 400 can include a thermoplastic polymeric composition. In such aspects, the thermoplastic polymeric composition can include one or more of polyurethanes, polyamides, polyolefins, or nylons that transition when thermoformed. As used herein, "thermoforming" refers to a process for turning a thermoplastic composition from a solid state to a softened or liquid state when subjected to certain temperatures at or above its melting point and then transitions back to the solid state when cooled.

As can be seen in the thermoplastic outer layer 400 depicted in FIG. 8, the thermoplastic outer layer 400 can extend along the entire underfoot portion 410. In the same or alternative aspects, the thermoplastic outer layer 400 can also encompass the toe end 402. For example, in the aspect depicted in FIG. 4, the thermoplastic outer layer 400 can extend from the underfoot region 410 up the lateral side 408 and over the toe end 402 and continue to the medial side 406 and down again to the underfoot region 410. Stated differently, the thermoplastic outer layer 400 can be wrapped around the toe end 402. In such aspects, the thermoplastic material in this portion of the toe end 402 can provide stability and rigidity, as well as function as a moisture barrier.

In the aspect depicted in FIG. 8, the outer layer 400 extends around the heel end 404. In certain aspects, in the heel end 404, the outer layer 400 extends from the underfoot region 410 up towards the ankle collar (e.g., the ankle collar 116 of the upper 100 of FIG. 1). In such an aspect, the thermoplastic material positioned in the heel end 404 can provide stability to the heel region of a wearer, in addition to functioning as a moisture barrier.

As discussed above, in certain aspects, the uppers disclosed herein can provide for effective load transfer from the underfoot region, e.g., the underfoot region 410, to a position past the biteline 114. For instance, as can be seen in FIG. 8, the outer layer 400 extends along the underfoot region 410 and up along the lateral side 408 to the apertures 414, which can function as eyestays, and up along the medial side 406 to the apertures 416, which can also function as eyestays. In such aspects, this continuity of the outer layer 400 can facilitate the transfer of a load from the underfoot region 410 to the medial midfoot region 407 and/or over the toe end 402, for example.

It should be understood that the particular positioning of the outer layer 400 depicted in FIG. 8 is just one aspect of the thermoplastic outer layer 400 for use in the uppers disclosed herein. Alternative patterns or positioning of the outer layer 400 are also contemplated for use in the uppers described herein. For instance, in certain aspects, the underfoot region 410 and/or the toe end 402 may be partly covered with the outer layer 400. In an alternative aspect, the outer layer 400 may substantially encompass the middle knit layer 300.

In the aspect depicted in FIG. 8, the outer layer 400 is comprised of multiple pieces of material that are coupled together. For example, the outer layer 400 includes at least one piece 418 extending along the underfoot region 410 that is coupled to another piece 420 that extends from the heel end 404 to the toe end 402 and up to the eyestays 414 and 416. In such an aspect, the pieces 418 and 420 can be coupled to one another using any conventional coupling techniques, including stitching or adhesive bonding. In one aspect, the pieces of the outer layer, e.g., the pieces 418 and 420, can be stitched together using a thermoplastic material, e.g., a thread comprising a thermoplastic material, where such a thermoplastic material of the thread has a melting temperature within (+/−) 20° C. of the melting temperature of the thermoplastic material of the outer layer. In such an aspect, upon thermoforming, the thread comprising the thermoplastic material and the pieces 418 and 420 may form one continuous thermoplastic piece, where the individual pieces 418 and 420, and the thread comprising the thermoplastic material are indistinguishable from one another. In another aspect, a thread or material can be used to secure or stitch together the pieces 418 and 420 that may not melt or decompose during the thermoforming process so that upon thermoforming the pieces 418 and 420 form one continuous thermoplastic piece with a thread embedded therein.

In aspects, the utilization of multiple pieces of a thermoplastic material to form the outer layer 400 can aid in minimizing any creases or accumulation of excess thermoplastic material when assembling the uppers disclosed herein, which can provide a more consistent and even outer layer 400. It should be understood that while the outer layer 400 depicted in FIG. 8 includes multiple pieces coupled together, in certain aspects, the outer layer 400 can be a single continuous layer of material.

In aspects, the outer layer 400 can form one continuous layer, even in aspects where the pre-thermoformed outer layer 400 included multiple pieces through the thermoforming process. For instance, during the thermoforming process, the pieces 418 and 420 would melt, flow, cool, and harden, thereby forming a continuous thermoplastic layer or film.

Figure 10:
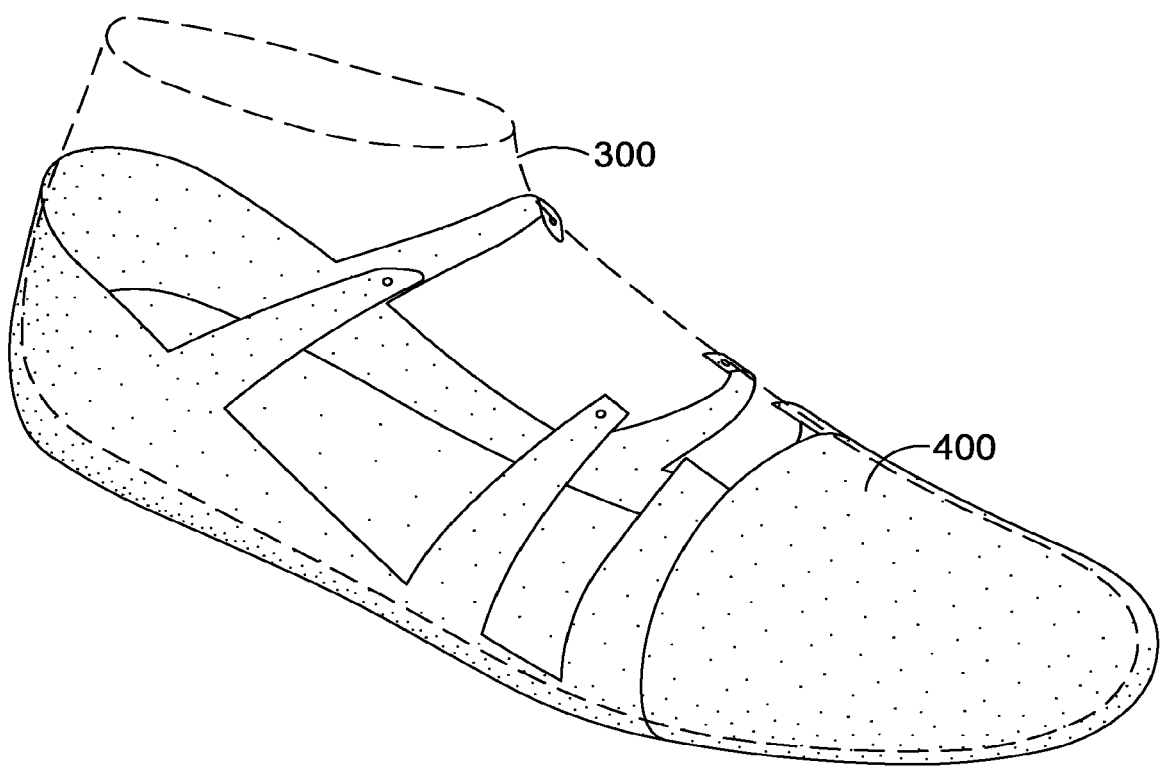
FIG. 10 is a top and side perspective view of an outer layer of an upper positioned over a middle knit layer of the upper, in accordance with aspects hereof.

FIG. 10 depicts the outer layer 400 with the middle knit layer 300 in phantom. In various aspects, as discussed above and further below, during thermoforming, the outer layer 400 can melt or deform upon heating and then solidify upon subsequent cooling. In such aspects, the thermoforming process may couple together the outer layer 400 and the middle knit layer 300. In such an aspect, the outer layer 400 may effectively "shrink wrap" around the portions of the middle knit layer 300 that the thermoplastic material of the outer layer 400 is in contact therewith. Such a coupling can provide for effective load transfer between the outer layer 400 and the middle knit layer 300.

In various aspects, in addition to the thermoformed coupling of the outer layer 400 to the middle knit layer 300, the outer layer 400 and the middle knit layer 300 can be mechanically coupled to the inner layer 200, e.g., through the coupling of the apertures 414 on the outer layer 400 to the apertures 326 of the middle knit layer 300. In such aspects, the outer layer 400 and the middle knit layer 300 can ultimately be coupled to the inner layer 200 also via coupling of the apertures 226 of the inner layer 200 (to the apertures 326 of the middle knit layer 300 and to the apertures 414 of the outer layer 400). In such an aspect, this coupling together of the layers 200, 300, and 400, allows for the transfer of a load from the underfoot region 410 of the outer layer 400 (and/or of the underfoot region 310 of the middle knit layer 300) to the functional inner layer 200. In one or more aspects, the outer layer 400 can alternatively or additionally be coupled to the middle knit layer 300 using a bonding agent and/or stitching.

As discussed above, the thermoforming process of the upper 100 includes turning a thermoplastic material or thermoplastic polymeric composition (e.g., associated with the outer layer 400) from a solid state to a softened or liquid state when subjected to certain temperatures at or above its melting point and then transitions back to the solid state when cooled. In such aspects, in order to form the upper 100 to the desired final shape, the upper 100 can be placed on a form prior to the thermoforming process. In aspects, the form may be any shape desired of the final upper structure. In various aspects, the form can be a portion or all of the toe end of the upper, the heel end of the upper, the midfoot region of the upper, and/or the forefoot region of the upper. In one aspect, the form can be a last, where the last exhibits the overall general shape of a foot.

Figure 11:
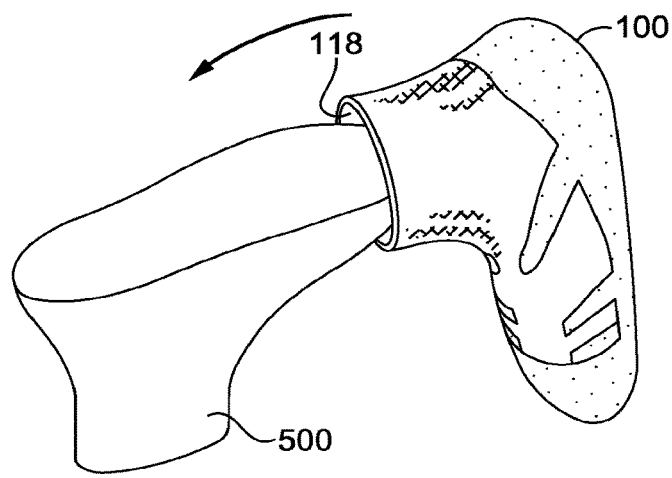
FIG. 11 is a top and side perspective view of an upper for an article of footwear being placed on a last, in accordance with aspects hereof.
Figure 12:
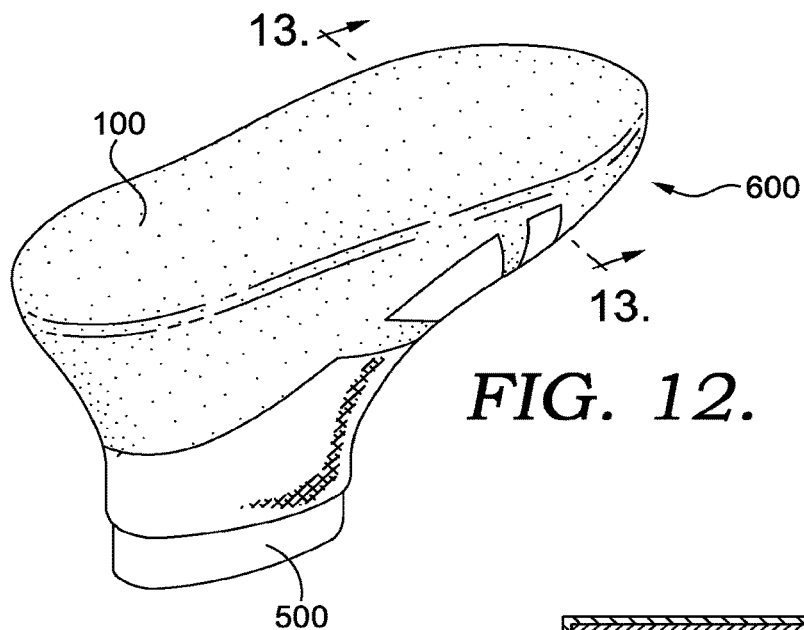
FIG. 12 is a top and side perspective view of an upper positioned on a last, in accordance with aspects hereof.
Figure 13:
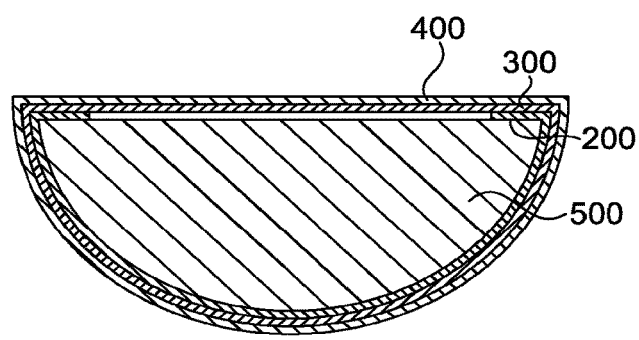
FIG. 13 is a cross-sectional view along the cutline 13 depicted in FIG. 12, particularly showing an inner layer, a middle knit layer, and an outer layer of the upper, in accordance with aspects hereof.

FIGS. 11-13 depict the upper 100 being placed on a last 500, as just one exemplary form for use in the thermoforming process. It should be understood that the general process discussed herein with respect to the use of a last is just one exemplary use of a form, and that other types of forms may be used in place of a last in the thermoforming processes discussed herein.

In aspects, the last 500 can be formed from any material. The last 500 depicted in FIGS. 11-13 is a rigid fixed-shape last 500; however, in alternative aspects the last 500 may be expandable and/or contractible. In various aspects, the last 500 is inserted into the void 118 of the upper 100 in order to position the upper 100 on the last 500, thereby forming a lasted upper 600. As can be seen in the cross-sectional view in FIG. 13, the upper 100 (e.g., that includes the inner layer 200, the middle knit layer 300, and the outer layer 400) wraps around the last 500 to aid in forming the upper 100 into the desired shape.

Figure 14:
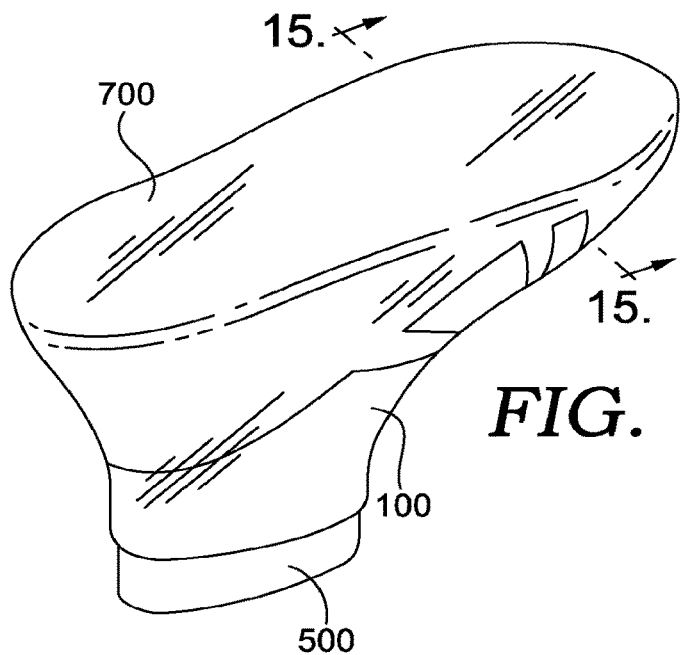
FIG. 14 is a top and side perspective view of an upper positioned on a last with a protective sheath positioned over the upper, in accordance with aspects hereof.
Figure 15:
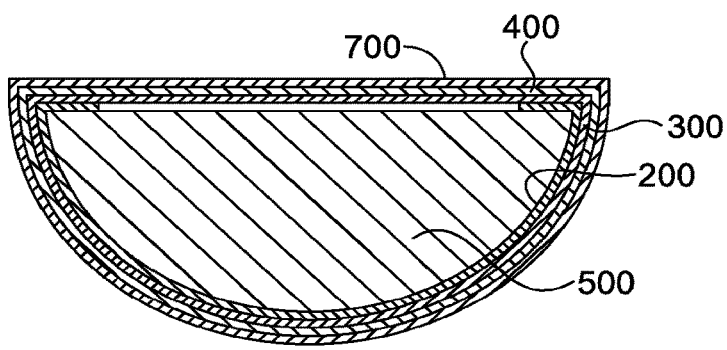
FIG. 15 is a cross-sectional view along the cutline 15 depicted in FIG. 14, particularly showing the protective sheath positioned over an outer layer, which is positioned over a middle knit layer, which is positioned over an inner layer, in accordance with aspects hereof.

In certain aspects, as discussed above, during the thermoforming process, at least a portion of the outer layer 400 may melt and flow. In one or more aspects, it may be desirable to restrict the flow of the melted thermoplastic polymeric composition. In such aspects, a protective sheath may be applied over the upper 100 positioned on a last 500. For example, as can be seen in FIGS. 14 and 15, a protective sheath 700 is positioned over the upper 100 positioned on the last 500. As best seen in the cross-sectional view depicted in FIG. 15, the protective sheath 700 is positioned adjacent the outer layer 400 with the middle knit layer 300 on the side of the outer layer 400 opposite that of the protective sheath 700. Further, as seen in FIG. 15, the inner layer 200 is positioned between the last 500 and the middle knit layer 300. In aspects, the protective sheath 700 can be formed of an elastomeric polymeric material that would not be deformed or melt during the thermoforming process or otherwise adversely affect the thermoforming of the upper 100.

In aspects, the protective sheath 700 may apply a compressive force to the outer layer 400 of the upper 100, which may aid in restricting the flow of the melted thermoplastic polymeric composition that may be present in the outer layer 400. This compressive force, in certain aspects, may also aid in coupling the outer layer 400 to the middle knit layer 300. Further, in aspects, a compressive force applied by the protective sheath 700 during the thermoforming process may aid in forming the upper 100 to the desired shape and form.

Figure 16:
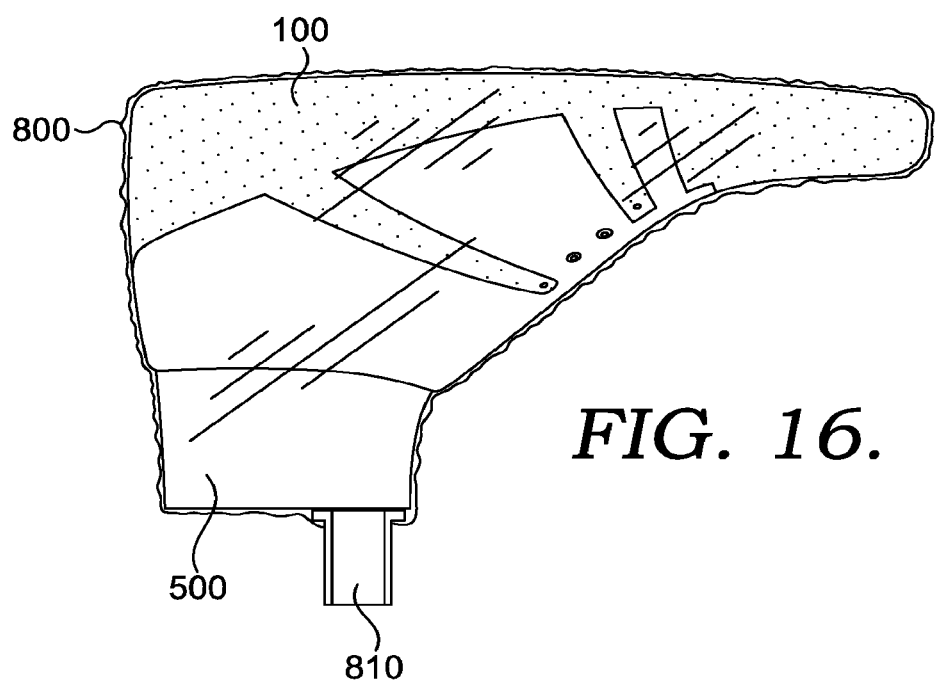
FIG. 16 is a side view of a lasted upper with a compression material compressed against the outer surface of the lasted upper, in accordance with aspects hereof.

In aspects, it may be desirable to increase the compressive force applied to the upper 100, relative to that applied by the protective sheath 700 alone. In such aspects, as can be seen in FIG. 16, a compression material 800, e.g., a vacuum bag, can be applied to the upper 100 positioned on the last 500. In the same or alternative aspects, the compression material 800 can be utilized in place of or in combination with the protective sheath 700. In aspects, the compression material 800 can be coupled to a valve 810 for exposing the inside of the compression material 800 and the upper 100 to negative pressure so as to cause the compression material 800 to apply a compressive force to the upper 100. The compression material 800 can be made from any type of material as long as such material does not melt or deform during the thermoforming process or otherwise adversely affect the thermoforming of the upper 100.

As discussed above, in certain aspects, the upper, e.g., the upper 100, can be coupled to a bottom unit. In certain aspects, the bottom unit can include an outsole. For instance, as can be seen in FIGS. 17A and 17B, a bottom unit 900 can be coupled to the underfoot region 110 of the upper 100. In one or more aspects, the bottom unit 900 can include any conventional outsole materials. In one aspect, the bottom unit 900 can be coupled to the underfoot region 110 of the upper 100 using conventional bonding agents.

In an alternative aspect, the bottom unit 900 can be coupled to the upper 100 utilizing the thermoplastic polymeric composition of the outer layer 400 as a bonding agent, e.g., by applying the bottom unit 90 to the upper 100 during the thermoforming process. For example in such an aspect, the thermoplastic polymeric composition of the outer layer 400 may be melted during a heating step of the thermoforming process and then mechanically bond to the bottom unit 900 as the thermoplastic polymeric composition is cooled and solidified during the cooling step of the thermoforming process.

Figure 18:
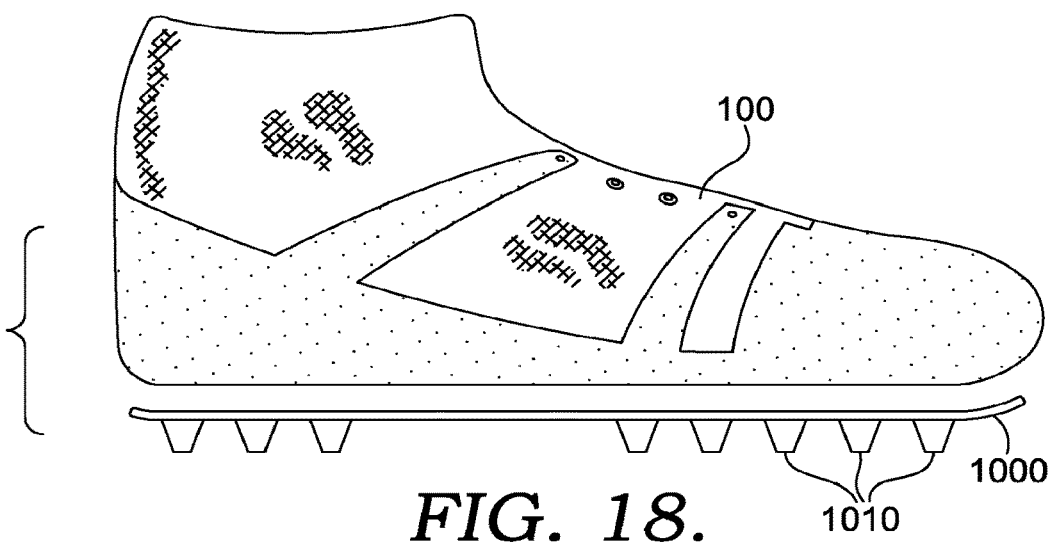
FIG. 18 is a side view of an upper and a bottom unit for securing to the underfoot portion of the upper, with the bottom unit comprising outward extending traction elements, in accordance with aspects hereof.

FIG. 18 depicts another aspect of a bottom unit 1000, that can be coupled to the upper 100. In the aspect depicted in FIG. 18, the bottom unit 1000 can include a plurality of traction elements 1010. The bottom unit 1000 can be coupled to the upper 100 in a manner similar to those described above with reference to the bottom unit 900 of FIGS. 17A and 17B.

Figure 19:
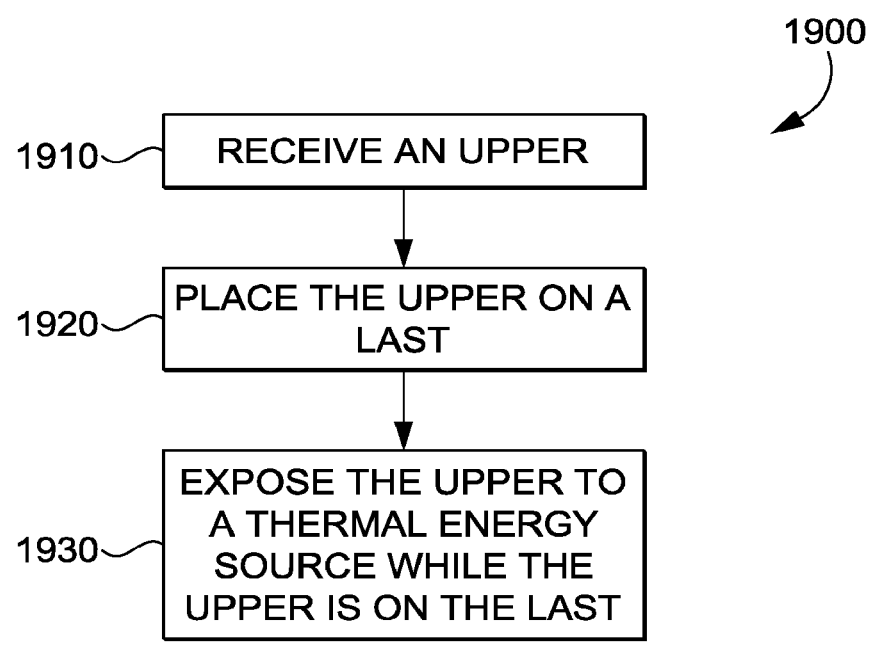
FIG. 19 is a schematic diagram of a method for manufacturing an upper for an article of footwear, in accordance with aspects hereof.

FIG. 19 depicts a method 1900 for manufacturing an upper for an article of footwear. The method 1900 can include the step 1910 of receiving an upper. In such an aspect, the upper can include any of the uppers disclosed herein, such as the upper 100 discussed above with reference to FIGS. 1-3. For instance, in one aspect, the upper can include an inner layer, a middle knit layer, and an outer layer. In one aspect, the inner layer can include any or all of the properties of the inner layer 200 discussed above with reference to FIGS. 3-6 and 9. In aspects, the inner layer can extend to at least the toe end, the heel end, the medial side, and the lateral side of the upper.

In various aspects, the middle knit layer can include any or all the properties of the middle knit layer 300 discussed above with reference to FIGS. 1-3 and 7-10. In one or more aspects, the middle knit layer can extend to an underfoot portion of the upper, where the middle knit layer is adjacent the inner layer at least at the medial side, the lateral side, the toe end, and the heel end of the upper.

In aspects, the outer layer can include any or all the properties of the outer layer 400 discussed above with reference to FIGS. 1-3, 8, and 10. In certain aspects, the outer layer can be positioned over at least a portion of the middle knit layer, and can extend from a first position below the biteline at the underfoot portion of the upper to a second position above the biteline in at least one selected from a midfoot region of the upper and the toe end of the upper.

Step 1920 of the method 1900 of FIG. 19 includes placing the upper on a form. In one aspect, the upper can be placed on a last, such as the last 500 discussed above with reference to 11-13, as being one example of the form.

Step 1930 of the method 1900 of FIG. 19 includes exposing the upper to a thermal energy source while the upper is on a form. In such an aspect, the thermal energy source can be any suitable thermal energy source for use in thermoforming articles. For instance in one aspect, the thermal energy source can be a heated medium, such as heated air or a heated liquid. In one or more aspects, the thermal energy source can include radiating elements and/or infrared lamps. In various aspects, the thermal energy source can be adjacent an air circulation system to circulate heated air in order to apply even heating to the surface of the upper. In such aspects, the upper may be exposed to a temperature near or above the melting temperature of the thermoplastic polymeric composition of the outer layer of the upper.

In various aspects, prior to exposing the upper to the thermal energy source, the upper may be covered with a protective sheath, such as the protective sheath 700 discussed above with reference to FIGS. 14 and 15. In the same or alternative aspects, the upper may be covered with a compression material, such as the compression material 800 discussed above with reference to FIG. 16.

In certain aspects, when the upper is exposed to the thermal energy source, a thermoplastic polymeric composition in the outer layer may melt and flow, and the compressive force of the compression material and/or protective sheath may compress the upper against the rigid form to a desired form, e.g., the outer shape of the form. Further, while the upper is on the form and subsequent to exposing the upper to the thermal energy source, the upper can be exposed to a temperature below the melting temperature of the thermoplastic polymeric composition of the outer layer of the upper in order to cool and harden the upper to the final desired shape.

The present disclosure can be described in accordance with the following numbered clauses.

Clause 1. An upper for an article of footwear, the upper having a toe end, a heel end, a medial side, a lateral side, and a biteline extending around the toe end, the medial side, the heel end, and the lateral side, the upper comprising: an inner layer extending to at least the toe end, the heel end, the medial side, and the lateral side of the upper; a middle knit layer extending to an underfoot portion of the upper, wherein the middle knit layer covers the inner layer at least at the medial side, the lateral side, the toe end, and the heel end of the upper; and an outer layer coupled with the middle knit layer, wherein the outer layer compositionally comprises at least one thermoplastic material, and wherein the outer layer extends from a first position below the biteline at the underfoot portion of the upper to a second position above the biteline, wherein the second position above the biteline is at least one selected from a midfoot region of the upper and the toe end of the upper.

Clause 2. The upper according to clause 1, wherein the middle knit layer extends along the underfoot portion of the upper from the lateral side to the medial side.

Clause 3. The upper according to any of clauses 1 or 2, wherein the inner layer comprises an inner surface and an opposing outer surface, wherein the inner layer has a first thickness between the inner surface and the outer surface in the midfoot region and a second thickness between the inner surface and the outer surface in the heel end, and wherein the first thickness is less than the second thickness.

Clause 4. The upper according to any of clauses 1-3, wherein the inner layer comprises an inner surface and an opposing outer surface, and wherein the inner layer has a first aperture extending through the inner surface and the outer surface at one selected from the medial side and the lateral side.

Clause 5. The upper according to clause 4, wherein the second position of the outer layer corresponds with the first aperture.

Clause 6. The upper according to any of clauses 1-5, wherein the middle knit layer is formed utilizing a circular knitting technique.

Clause 7. The upper according to any of clauses 1-6, wherein the middle knit layer is formed utilizing a flat knitting technique.

Clause 8. The upper according to any of clauses 1-7, wherein the outer layer extends from the medial side to the lateral side across the toe end of the upper.

Clause 9. The upper according to any of clauses 1-8, wherein prior to thermoforming the upper from a first state into a second state, the outer layer of the upper in the first state comprises at least two distinct portions secured to one another, and wherein the outer layer of the upper in the second state includes a continuous thermoplastic layer.

Clause 10. The upper according to clause 9, wherein the at least two distinct portions are secured to one another utilizing a second thermoplastic material having a melting point within (+/−) 20° C. of a melting point of the at least one thermoplastic material of the outer layer.

Clause 11. The upper according to any of clauses 1-10, wherein prior to thermoforming the upper from a first state into a second state, the outer layer of the upper in the first state comprises: a first portion comprising a first thermoplastic material of the at least one thermoplastic material; and a second portion that is distinct from the first portion, the second portion comprising a second thermoplastic material of the at least one thermoplastic material, and wherein, in the second state, the first and second thermoplastic materials have been melted and set to stop flow of the first and second thermoplastic materials leaving no distinct structure of either the first or second thermoplastic materials.

Clause 12. A method for manufacturing an upper for an article of footwear, the upper having a toe end, a heel end, a medial side, a lateral side, and a biteline extending around the toe end, the medial side, the heel end, and the lateral side, the method comprising: receiving an upper, the upper comprising: an inner layer extending to at least the toe end, the heel end, the medial side, and the lateral side of the upper; a middle knit layer extending to an underfoot portion of the upper, wherein the middle knit layer is adjacent the inner layer at least at the medial side, the lateral side, the toe end, and the heel end of the upper; and an outer layer that is adjacent to at least a portion of the middle knit layer, wherein the outer layer compositionally comprises at least one thermoplastic material, wherein the outer layer extends from a first position below the biteline at the underfoot portion of the upper to a second position above the biteline, and wherein the second position above the biteline is at least one selected from a midfoot region of the upper and the toe end of the upper; placing the upper on a form; and exposing the upper to a thermal energy source while the upper is positioned on the form.

Clause 13. The method according to clause 12, wherein the middle knit layer extends along the underfoot portion of the upper from the lateral side to the medial side.

Clause 14. The method according to clause 12 or 13, wherein the outer layer comprises at least two distinct portions secured together.

Clause 15. The method according to clause 14, wherein subsequent to the exposing the upper to a thermal energy source while the upper is positioned on the form, the at least two distinct portions of the outer layer form a continuous thermoplastic film.

Clause 16. The method according to clause 15, wherein the continuous thermoplastic film is coupled to at least a portion of middle knit upper.

Clause 17. The method according to any of clauses 12-16, wherein the inner layer comprises an inner surface and an opposing outer surface, and wherein the inner layer has a first aperture extending through the inner surface and the outer surface at one selected from the medial side and the lateral side, and wherein the second position of the outer layer corresponds with the first aperture.

Clause 18. The method according to any of clauses 12-17, wherein the middle knit layer is formed utilizing a circular knitting technique.

Clause 19. The method according to any of clauses 12-18, wherein the outer layer extends from the medial side to the lateral side across the toe end of the upper.

Clause 20. The method according to any of clauses 12-19, wherein the exposing the upper to the thermal energy source while the upper is positioned on the form comprises exposing the upper to a temperature above a melting temperature of the at least one thermoplastic material.

Clause 21. The method according to clause 20, further comprising, subsequent to the exposing the upper to the thermal energy source while the upper is positioned on the form, exposing the upper to a temperature below the melting temperature of the at least one thermoplastic material while the upper is positioned on the form.

Clause 22. The method according to any of clauses 12-21, further comprising placing a protective sheath over the upper while the upper is positioned on the form, prior to the exposing the upper to the thermal energy source while the upper is positioned on the form.

Clause 23. The method according to any of clauses 12-22, wherein the form comprises a last.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the disclosure herein.

While specific elements or steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. An upper for an article of footwear, the upper having a toe end, a heel end, a medial side, a lateral side, and a bite line extending around the toe end, the medial side, the heel end, and the lateral side, the upper comprising:
   an inner layer extending to at least the toe end, the heel end, the medial side, and the lateral side of the upper;
   a middle knit layer extending to an underfoot portion of the upper, wherein the middle knit layer covers the inner layer at least at the medial side, the lateral side, the toe end, and the heel end of the upper, and wherein the middle knit layer extends, in the underfoot portion of the upper, between the lateral side and the medial side, and between the toe end and the heel end; and
   an outer layer coupled with the middle knit layer, wherein the outer layer compositionally comprises at least one thermoplastic material, wherein the outer layer extends from a first position below the bite line at the underfoot portion of the upper to a second position above the bite line, and wherein the second position above the bite line is at least one selected from a midfoot region of the upper and the toe end of the upper.

2. The upper according to claim 1, wherein the inner layer comprises an inner surface and an opposing outer surface, wherein the inner layer has a first thickness between the inner surface and the outer surface in the midfoot region and a second thickness between the inner surface and the outer surface in the heel end, and wherein the first thickness is less than the second thickness.

3. The upper according to claim 1, wherein the inner layer comprises an inner surface and an opposing outer surface, and wherein the inner layer has a first aperture extending through the inner surface and the outer surface at one selected from the medial side and the lateral side.

4. The upper according to claim 3, wherein the second position of the outer layer corresponds with the first aperture.

5. The upper according to claim 1, wherein the middle knit layer is formed utilizing a circular knitting technique.

6. The upper according to claim 1, wherein the middle knit layer is formed utilizing a flat knitting technique.

7. The upper according to claim 1, wherein the outer layer extends from the medial side to the lateral side across the toe end of the upper.

8. The upper according to claim 1, wherein the outer layer of the upper includes a continuous thermoplastic layer.

9. The upper according to claim 1, wherein the outer layer compositionally comprises a first thermoplastic material and a second thermoplastic material, the second thermoplastic material being different from the first thermoplastic material.

\* \* \* \* \*